United States Patent
Lepp et al.

(10) Patent No.: US 12,338,895 B1
(45) Date of Patent: Jun. 24, 2025

(54) BELT TENSIONING APPARATUS FOR DRIVE MECHANISMS

(71) Applicant: SPRINGLAND MANUFACTURING, Rivers (CA)

(72) Inventors: Henry Lepp, Rivers (CA); Roy Alvarenga, Rivers (CA)

(73) Assignee: SPRINGLAND MANUFACTURING, Rivers (CA)

( * ) Notice: Subject to any disclaimer, the term of this patent is extended or adjusted under 35 U.S.C. 154(b) by 0 days.

(21) Appl. No.: 18/621,431

(22) Filed: Mar. 29, 2024

(51) Int. Cl.
*F16H 7/12* (2006.01)
*B65G 33/34* (2006.01)
*F16H 7/08* (2006.01)

(52) U.S. Cl.
CPC .......... *F16H 7/1281* (2013.01); *B65G 33/34* (2013.01); *B65G 2812/0505* (2013.01); *F16H 2007/081* (2013.01); *F16H 2007/0825* (2013.01); *F16H 2007/0842* (2013.01); *F16H 2007/0865* (2013.01); *F16H 2007/088* (2013.01); *F16H 2007/0893* (2013.01); *F16H 2007/0897* (2013.01)

(58) Field of Classification Search
CPC ....... F16H 2007/0893; F16H 2007/081; F16H 7/1281; F16H 7/14; F16H 2007/088; F16H 2007/0823; F16H 2007/0861; F16H 2007/0887
USPC ................................ 474/135, 133, 110, 102
See application file for complete search history.

(56) References Cited

U.S. PATENT DOCUMENTS

| | | | | |
|---|---|---|---|---|
| 2,153,705 A * | 4/1939 | Andersen | .................. | F16H 7/14 248/653 |
| 2,475,426 A * | 7/1949 | Ewaldson | ............... | D21F 7/005 474/135 |
| 2,666,333 A * | 1/1954 | Geyer | ....................... | F16H 7/14 474/113 |
| 3,098,396 A * | 7/1963 | Unruh | ....................... | F16H 7/04 474/133 |
| 3,207,332 A * | 9/1965 | Buschbom | .......... | A01F 25/2009 474/86 |
| 3,250,407 A * | 5/1966 | Hildebrand | .......... | B65G 65/466 251/303 |
| 3,403,774 A * | 10/1968 | Mayrath | .................. | F16H 7/14 198/674 |
| 3,456,519 A * | 7/1969 | Anderson | ............ | H02K 7/1004 474/113 |
| 3,851,774 A * | 12/1974 | Laidig | .................. | B65G 65/466 414/307 |
| 4,362,062 A * | 12/1982 | Peterson | .................. | G01L 5/06 73/862.472 |
| 4,454,236 A * | 6/1984 | Foster | ..................... | F16H 7/129 474/135 |

(Continued)

*Primary Examiner* — Henry Y Liu
(74) *Attorney, Agent, or Firm* — Paul S. Sharpe; The Sharpe Group

(57) ABSTRACT

A belt tensioning apparatus for use in tensioning a belt driven drive system having a motor and belt driven member. The arrangement provides a mounting member with a belt tensioning member operatively connected thereto for applying adjustable tension to a belt when positioned about the motor and belt driven member. An actuator connected to the belt tensioning member allows for movement of the belt tensioning member. A tension operating zone member operable with the actuator is used to alert a user when belt tension is optimal, requires adjustment or is prohibitive.

20 Claims, 8 Drawing Sheets

(56) References Cited

U.S. PATENT DOCUMENTS

| | | | | |
|---|---|---|---|---|
| 4,585,385 A * | 4/1986 | Buschbom | B65G 65/466 | |
| | | | 198/813 | |
| 4,678,953 A * | 7/1987 | Johnson | H02K 5/26 | |
| | | | 310/91 | |
| 4,767,383 A * | 8/1988 | St. John | F16H 7/1281 | |
| | | | 474/111 | |
| 4,957,471 A * | 9/1990 | St. John | F16H 7/1281 | |
| | | | 474/135 | |
| 5,064,405 A * | 11/1991 | St. John | F16H 7/1281 | |
| | | | 474/133 | |
| 5,078,655 A * | 1/1992 | Brandenstein | F16H 7/1281 | |
| | | | 474/107 | |
| 5,273,494 A * | 12/1993 | Varin | F16H 7/129 | |
| | | | 474/110 | |
| 5,439,420 A * | 8/1995 | Meckstroth | F16H 7/1236 | |
| | | | 474/133 | |
| 5,733,214 A * | 3/1998 | Shiki | F01L 1/02 | |
| | | | 474/69 | |
| 6,688,022 B2 * | 2/2004 | Hanafusa | F16D 48/064 | |
| | | | 474/109 | |
| 7,090,606 B2 * | 8/2006 | Dec | F16H 7/1281 | |
| | | | 474/135 | |
| 7,217,206 B2 * | 5/2007 | Stone | F16H 7/1281 | |
| | | | 474/110 | |
| 7,217,207 B1 * | 5/2007 | Hallen | F16H 7/129 | |
| | | | 474/135 | |
| 7,226,377 B2 * | 6/2007 | Kraus | F16H 7/1209 | |
| | | | 474/135 | |
| 7,544,031 B2 * | 6/2009 | Kaeb | B65G 65/466 | |
| | | | 414/318 | |
| 7,552,708 B2 * | 6/2009 | Serkh | F16H 7/1218 | |
| | | | 123/198 R | |
| 7,771,302 B2 * | 8/2010 | Pendergrass | F16H 7/1281 | |
| | | | 474/109 | |
| 7,837,582 B2 * | 11/2010 | Smith | F16H 7/1281 | |
| | | | 474/138 | |
| 7,921,626 B2 * | 4/2011 | Maertens | A01D 41/1276 | |
| | | | 56/10.2 G | |
| 8,840,495 B2 * | 9/2014 | Comsa | F01L 1/024 | |
| | | | 474/135 | |
| 9,151,366 B2 * | 10/2015 | Antchak | F16H 7/12 | |
| 9,464,697 B2 * | 10/2016 | Antchak | F16H 7/12 | |
| 9,700,979 B2 * | 7/2017 | Schwaiger | B23Q 5/14 | |
| 9,863,310 B2 * | 1/2018 | Pendovski | F16H 7/08 | |
| 10,299,436 B2 * | 5/2019 | Bailliu | A01D 41/06 | |
| 11,041,548 B2 * | 6/2021 | Willis | F16H 7/12 | |
| 11,105,401 B2 * | 8/2021 | Chinnel | G01L 5/04 | |
| 11,255,415 B2 * | 2/2022 | Gross | F01P 5/04 | |
| 11,572,934 B2 * | 2/2023 | Scott | F16H 7/08 | |
| 11,754,150 B2 * | 9/2023 | Dong | F16H 7/10 | |
| | | | 474/112 | |
| 12,128,420 B2 * | 10/2024 | Adams | F16H 7/1236 | |
| 2002/0039945 A1 * | 4/2002 | Ali | F16H 7/1236 | |
| | | | 474/135 | |
| 2005/0192142 A1 * | 9/2005 | Stone | F01L 1/024 | |
| | | | 474/112 | |
| 2006/0240922 A1 * | 10/2006 | Pendergrass | F16H 7/1281 | |
| | | | 474/102 | |
| 2007/0099736 A1 * | 5/2007 | Hallen | F16H 7/129 | |
| | | | 474/101 | |
| 2009/0156340 A1 * | 6/2009 | Seo | F16H 7/1281 | |
| | | | 474/113 | |
| 2009/0240922 A1 * | 9/2009 | Hutton | G06F 9/3828 | |
| | | | 712/E9.032 | |
| 2011/0312454 A1 * | 12/2011 | Comsa | F01L 1/024 | |
| | | | 474/135 | |
| 2012/0065009 A1 * | 3/2012 | Mueller | F02B 67/06 | |
| | | | 474/101 | |
| 2013/0172137 A1 * | 7/2013 | Antchak | B60K 25/02 | |
| | | | 474/133 | |
| 2014/0130635 A1 * | 5/2014 | Kees | F02N 15/08 | |
| | | | 474/101 | |
| 2014/0309882 A1 * | 10/2014 | Antchak | F02B 67/06 | |
| | | | 474/104 | |
| 2015/0217943 A1 * | 8/2015 | Friestad | F16H 7/14 | |
| | | | 198/813 | |
| 2016/0363046 A1 * | 12/2016 | Pendovski | F16H 7/08 | |
| 2017/0037941 A1 * | 2/2017 | Trick | F16H 7/1281 | |
| 2017/0175858 A1 * | 6/2017 | Ryeland | F02B 67/06 | |
| 2018/0372190 A1 * | 12/2018 | Brandon | F16H 7/1281 | |
| 2020/0032883 A1 * | 1/2020 | Chinnel | G01L 5/042 | |
| 2020/0088275 A1 * | 3/2020 | Dong | F16H 7/1254 | |

* cited by examiner

BELT TENSIONING APPARATUS FOR DRIVE MECHANISMS

FIELD OF THE INVENTION

The present invention relates to a belt tensioning device and more particularly, the present invention relates to a tensioning device with an indicator for ensuring proper tensioning of a belt driven drive mechanism.

BACKGROUND OF THE INVENTION

It is well established for material handling and unloading devices, which are belt driven, that correct belt tension is quite important. There have been numerous advancements in the art to ameliorate tension variation, however users typically tighten drive belts by feel. This method is inexact, since over tightening a drive belt can easily occur and result in reduced bearing life. Under tightening a drive belt can lead to belt slipping and plugging of the unload system.

In the prior art there are a number of documents directed to belt tension management, drive mechanisms inter alia.

In an early development, Anderson, in U.S. Pat. No. 3,456,519 provides a pulley and shaft support. In the disclosure, Anderson teaches:

"As will be seen in FIGS. 1, 3 and 4, the countershaft 50 may mount a separate pulley 62 which would cooperate with a pulley 64 on an output shaft 15 of the motor with a suitable belt d5 riding in the grooved pulleys in a driving relationship. The relative size of the respective pulleys may be interchanged for high or low speed operation of the countershaft and the work tool or work drive associated therewith. For example, the countershaft may mount a suitable grinding tool 68 and if desired another tool on opposite extremity of the same to provide a dual working function with a high speed operation. With an interchange in the shape or diameter of the pulleys on the motor and countershaft, a similar low speed operation may be obtained for drive purposes. The particular position of the work tool or the drive connection thereto may be interchanged to either end of the countershaft, as will be seen hereinafter. By raising the coupling members 35 on the rods or threaded shafts 29, 30, the belt may be tightened for any pulley configuration to provide a positive driving relationship and the adjustment and the position of the coupling members will be effected merely by release of the nuts 40 on one side of the tubular parts and a threading in the opposite direction of the nuts on the opposite side of the coupling parts to raise or lower the coupling members to the shaft supports on which they are slidably mounted.

By Anderson's teachings, tension adjustment is possible to a certain degree.

Buschbom, in U.S. Pat. No. 3,207,332, provides a silo unloader driving mechanism and method for tensioning driving means. The teachings indicate:

"To tighten belts 26 and 27, one proceeds as described below. The nut and bolt assemblies 54 are loosened and collars 29 are slidably adjusted along frame members 10 and away from the shafts 21 and by backing off the nuts 41 and 42 nearer the free ends of the rods 35 and 36 and tightening their counterparts that are closest to the shafts 15 and 21. As collars 29 are moved slidably along the frame members 10, tension placed on the belts 26 and 27 by the weight of motor 24 will gradually cause the belts to lift the motor into a position such as shown in FIG. 1 or higher. As the tube 30 is somewhat closer to the center line between the motor pulley and pulley 22 than it is to the center line between motor pulley 25 and the pulley 16, belt 27 will acquire somewhat greater tension than belt 26. When the tension on bell 27 becomes close to desired tension, the nuts 42 and 41 are tightened against the ears 39 and 40 respectively to secure collars 29 in their adjusted position. Pressure is then applied to the motor 24 or motor leg 44 to cause a sliding movement of bracket legs 46 with respect to plates 49.

As the motor 24 pivots, the angle formed by lines drawn from the shaft 15 to tube and from tube 30 to the shaft of motor 24 changes in size moving toward but without reaching 180 degrees. The angle formed by the line from shaft 21 to tube 30 and tube 30 to the motor shaft also changes in the same direction.

As the latter angle is more obtuse to begin with, than the angle Including the line extending from shaft 15 to tube 30, this tendency for the two angles to become ones of 180 degrees will produce less tightening action with respect to belt 27 than it does with respect to belt 26. As belt 27 was brought to nearly operative tension by the sliding action of the motor mount, the two belts will both be in correct tension when pivoting of motor 24 has placed belt 26 under proper tension. Stated another way, as the motor is pivoted about tube 30, the two belts each are forced to describe an arc with respect to their respective shafts 15 and 21. These two arcs will intersect at only one place. This point of intersection is the point where both belts have been provided with appropriate tension.

In this document, Buschbom provides a pivotably movable motor which is also slidable, however the arrangement does not allow for a user to know exactly when the belts are properly tensioned. Accordingly, the arrangement is relying on a "feel" type of accuracy as noted as a problem supra.

In U.S. Pat. No. 4,678,593, Johnson provides a motor mount assembly having a base plate secured on each of device for driving by the motor. The specification teaches that the motor is mounted on a support plate incorporating a pivot shaft at the rear thereof for simple attachment and detachment for pivotal action to one side of any of the base plates. A compression spring between the front of the support plate and the device is used to urge the support plate and the motor upwardly to supply sufficient tension to a drive belt operatively extending between the motor and the device upon which the motor is detachably secured.

As with the other arrangements in the prior art, the Johnson device does not provide any arrangement to ensure that proper tension is determinable by a user. With the pivoting motor structure, one is left to guessing if the tension is ideal.

Brandenstein et al., in U.S. Pat. No. 5,078,655, discloses a precalibration arrangement for belt tension. The Abstract indicates:

"A method for adjusting the tension of a drive belt wherein a tensioning device is pretensioned, e.g., after manufacturing at the plant, with a force corresponding to the force desired for subsequent operation. At this position, calibration markings are formed which can be checked during subsequent adjustments. After being mounted, the drive belt is tensioned until the markings line up."

Although a useful arrangement, in material handling systems such as grain transport, the markings may fade or become visibly indiscernible over time.

Other generally relevant documents in this area include U.S. Pat. Nos. 3,207,332; 4,957,741; 9,700,979 and US Publication No. 2017003794.

From a review of the prior art in toto for this area of technology, each one of the prior art references has merit, however the art has not provided teachings where belt tensioning for a drive motor can be properly tensioned with visual/audible indication of proper tensioning. Accordingly, there is still a need to provide improved methods and configurations for achieving this goal.

The present invention to be discussed in detail herein after provides for such requisite improved methods.

SUMMARY OF THE INVENTION

One object of the present invention is to provide a tensioning arrangement for indicating to a user utilizing a belt driven system, the correct belt tension to reduce premature motor wear and belt wear.

A further object of one embodiment of the present invention is to provide a belt tensioning apparatus for use in tensioning a belt driven drive system having a motor and belt driven member, comprising:
- a mounting member for mounting adjacent the motor and the belt driven member;
- a belt tensioning member operatively connected to the mounting member moveable for applying adjustable tension to a belt when positioned about the motor and the belt driven member;
- an actuator operatively connected to the belt tensioning member for effecting movement of the belt tensioning member; and
- a tension operating zone member operable with the actuator to alert a user when belt tension is optimal, requires adjustment or is prohibitive.

Prior to the instant technology, belt tension was effectively guessed as noted above. Users could also use a deflection force scale, but this is rather inconvenient and does not allow for effective tension management. Use of such devices can also be quite cumbersome.

As a possible embodiment, the tension indicator member comprise a mechanical pointer for reference with indicia associated with the tension operating zone member In other embodiments, the tension indicator member may comprise a switch operable with mechanical, electromechanical, electromagnetic arrangement attributed to the tension operating zone member.

For convenience, the tension operating zone member may comprise, for example, one or a plurality of LEDs illuminated by suitable electrical connection with the tension indicator member. Further, audible means may be included to augment or substitute the LED arrangement.

Advantageously, belt tensioning may be controllable remotely by a user. To this end, the apparatus may include a transmitter member for transmitting at least one of motor speed, belt tension, belt temperature and driven member speed. Such data may be logged in a computer to analyze overall performance and efficiencies.

The arrangements find particular use in grain, sweep, portable or general unloading arrangements known to those skilled in this area of the agriculture art.

The tensioning system disclosed herein is also useful in other areas utilizing belt drives, such as conveyors, presses, sawmills, laundry devices, exhaust systems, pumps inter alia. Accordingly, another object of one embodiment of the invention provides a tensioning system for adjusting belt tension of an apparatus having a belt driven drive member connected to a driving motor, comprising:
- a movable motor support;
- a tensioning idler roller operatively connected to the moveable motor support for applying or lessening tension to a belt positioned about the drive member and the driving motor; and
- a tension indicator arrangement operatively connected to the tensioning idler roller for indicating to a user of the apparatus an optimal belt tension during use of the apparatus.

A further object of one embodiment of the present invention is to provide a method for adjusting belt tension in a belt driven apparatus having a motor and belt driven member, comprising:
- providing a mounting member for mounting adjacent the motor and the belt driven member;
- applying adjustable tension to a belt when positioned about the motor and the belt driven member with a belt tensioning member operatively connected to the mounting member;
- utilizing an actuator operatively connected to the belt tensioning member for effecting movement of the belt tensioning member; and
- providing at least one of visual and audible information to a user when belt tension is optimal, requires adjustment or is prohibitive.

Having thus generally described the invention, reference will now be made to the accompanying drawings, illustrating preferred embodiments.

BRIEF DESCRIPTION OF THE DRAWINGS

Similar numerals employed in the Figures denote similar elements.

DETAILED DESCRIPTION OF THE PREFERRED EMBODIMENTS

Figure 1:
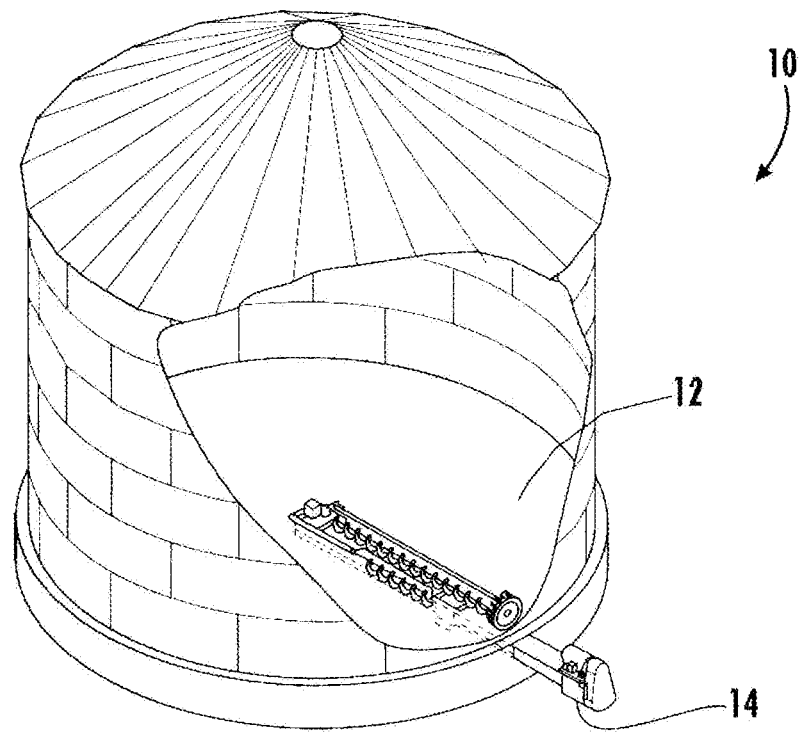
FIG. 1 is a schematic illustration of a silo with an embodiment of the invention shown generally in a use environment.
Figure 2:
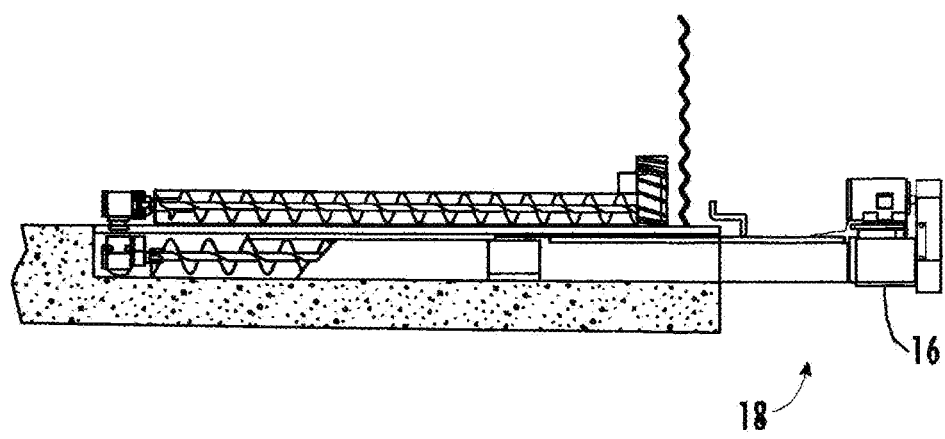
FIG. 2 is a cut away side view of FIG. 1.

Referring now to FIG. 1, shown is a conventional silo 10 for retaining silage into which is disposed an unloader device, shown in the example as an auger 12. The auger 12 is connected to a motor operated belt drive arrangement generally denoted by numeral 14. There is an opening 16 at the end 18 of the arrangement for discharge of the material as is known in the art. The latter is shown in FIG. 2.

Figure 3:
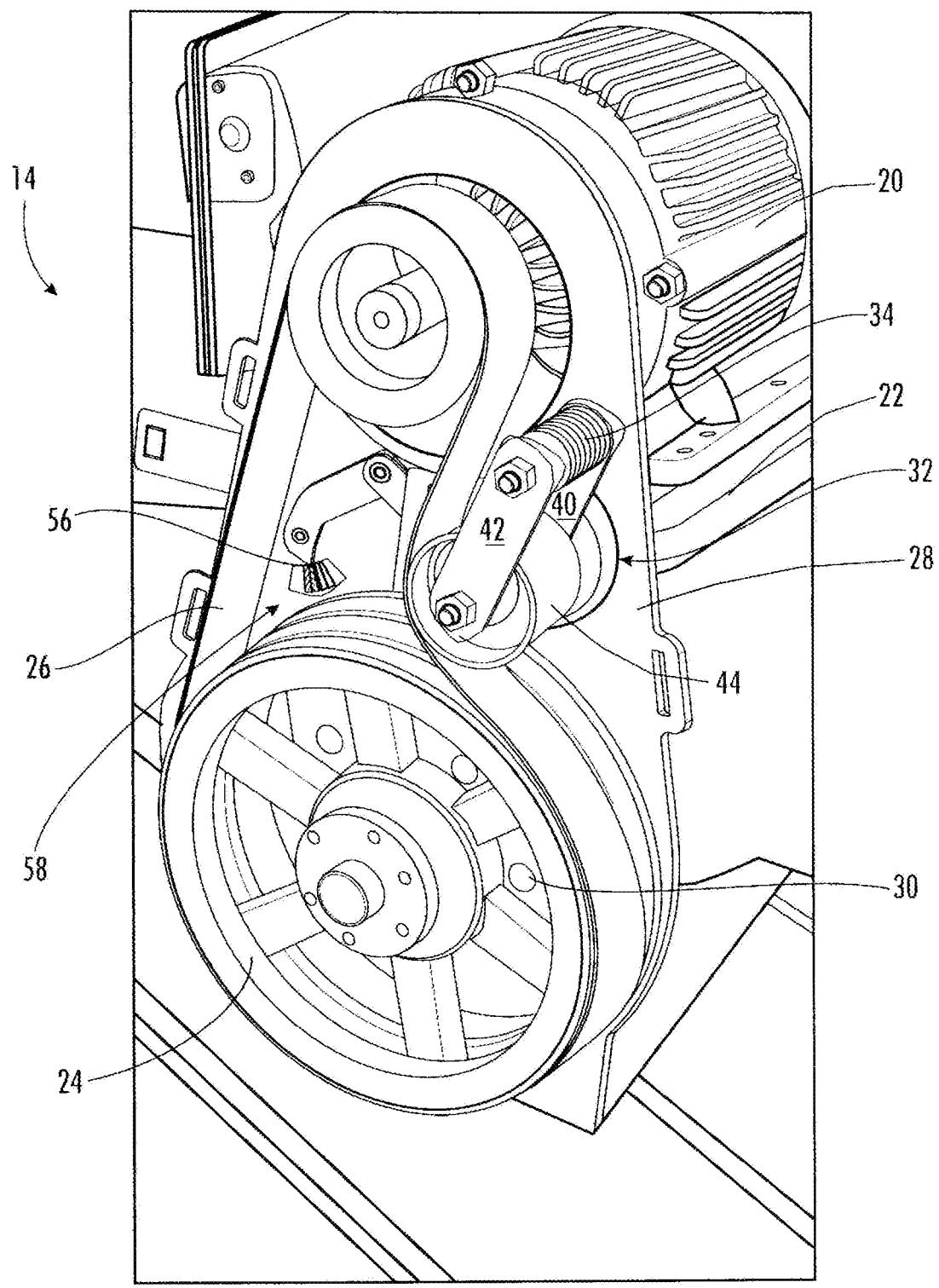
FIG. 3 is a front view in accordance with a first embodiment of the present invention.

FIG. 3 shows an end view of a first embodiment of the present invention. In the embodiment shown, a motor 20 is mounted to the powerhead 22 of the device. A pulley 24 is connected to the auger 12 (not shown in FIG. 3) and a belt or belt system 26 is positioned about the motor 20 and pulley 24.

A mounting member 28 is fixedly secured to the powerhead 22 with suitable fasteners 30 for mounting adjacent the motor 20 and pulley 24.

Figure 4:
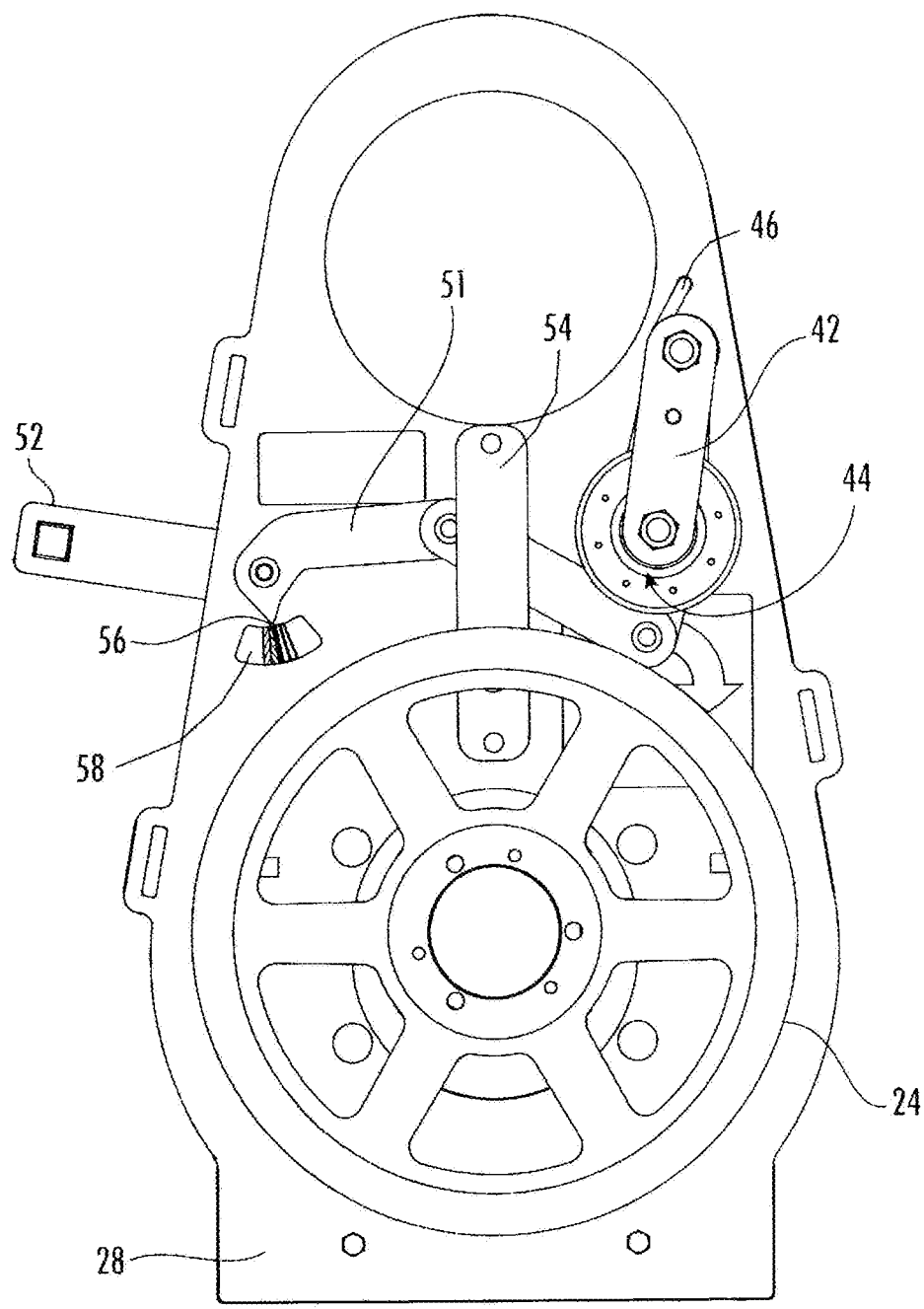
FIG. 4 is a front view of the arrangement.
Figure 4A:
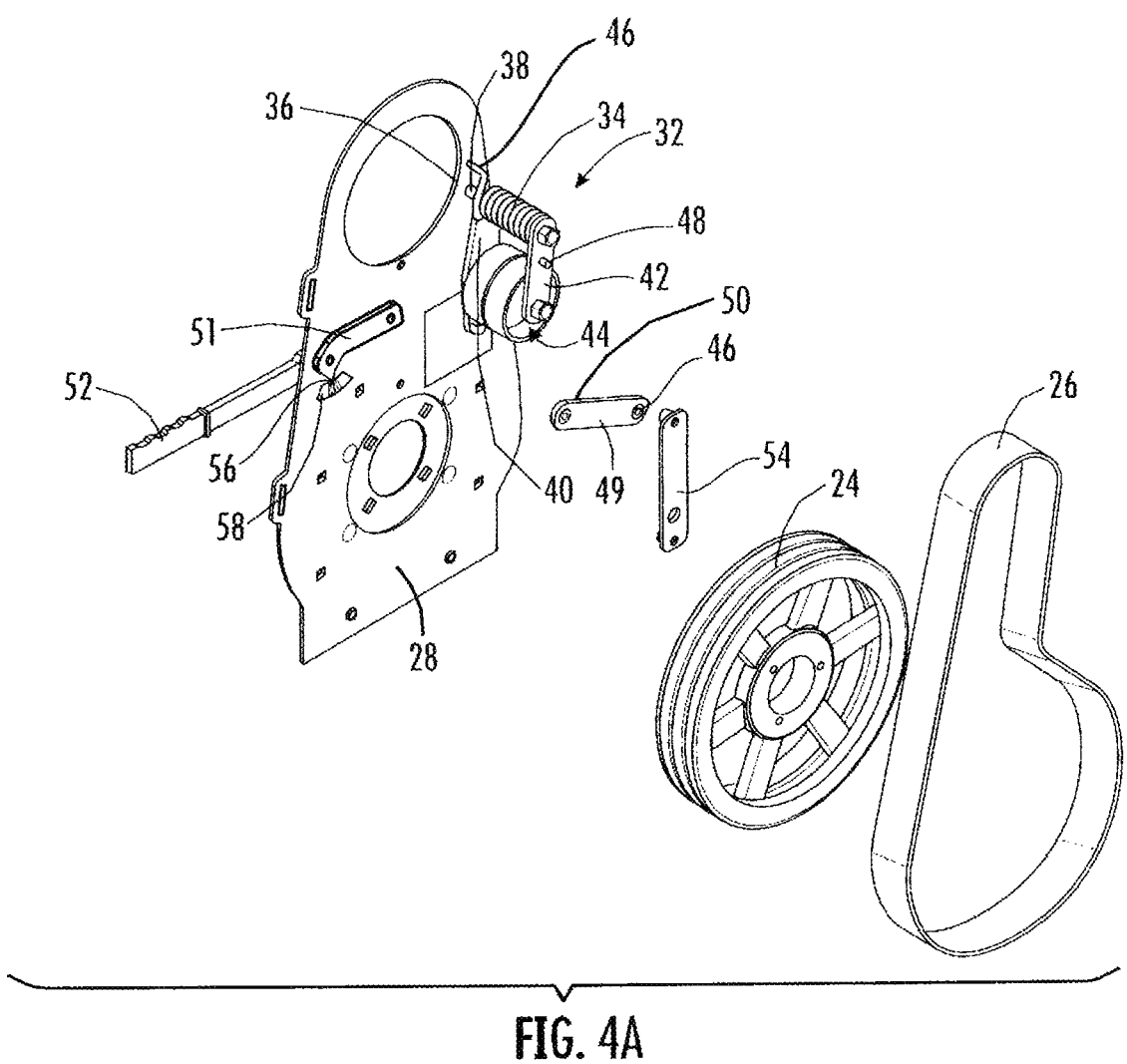
FIG. 4A is an exploded view of FIG. 3 with parts removed for clarity.

A belt tensioning member 32 is movably mounted to member 28. Reference, in combination with FIGS. 4 and 4A, assists with clarity. The tensioning member 32 includes, in the example, a pretensioned spring 34 about an axle 36. Axle 36 is connected at one end 38 to member 28 and linkage 40. A second linkage 42 is connected at the opposed end of the axle 36.

An idler roller 44 is rotatably received between the linkages 40 and 42. Spring 34 has legs, one of which 46 is connected to support 28 and the second of which 48 is connected to linkage 42. The lower end of linkage 40 is movably connected at 46 to a third or intermediate linkage 49 (shown in front of the roller 44 for clarity but disposed behind roller 44 in connection) with the opposed end 50 of linkage 49 being movably connected to an actuator 51. Actuator 51 may include an operating lever 52.

By movement of operating lever 52, for example in an upward direction, the result is that actuator 51, by its connection to linkage 49, results in movement of idler roller 44 out of engagement with belt system 26. In this manner, the belt system may be inspected for wear or replaced. Further, at this time, the pulley 24 is inactivated and thus is the auger 12 (FIG. 1). Linkage 49, by the indirect connection to the biased roller 44 as described above, allows the operator to lock or fix the biased roller 44 in to or out of engagement with belt 26.

Retainer linkage 54 overlies linkage 49 and is fixed to support member 28 with suitable fasteners (not shown) and rotatably receives linkage 49 at 46. Movement of operating lever 52 in a downward direction will position the idler roller 44 into engagement with the belt system 26 to apply tension to the belt system 26 as generally depicted in FIG. 3.

Figure 3A:
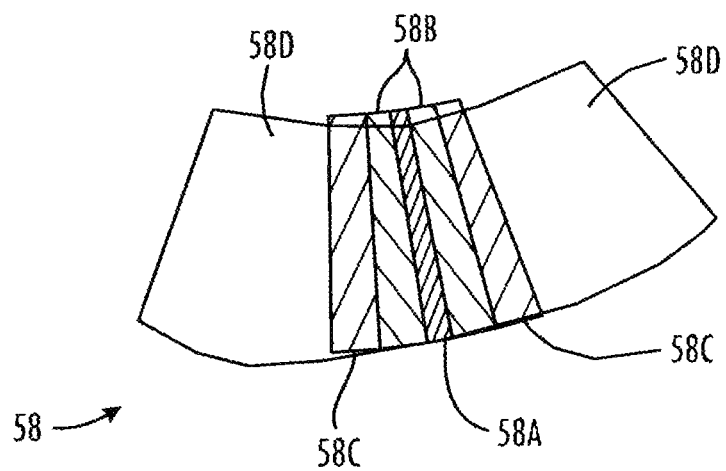
FIG. 3A is an enlarged view of the indicia.

In one embodiment, actuator 51 may include a pointer 56. Pointer 56 cooperates with tension operating zone member globally denoted by numeral 58. In the example, tension operating zone member 58 comprises indicia of differing sections positioned on support 28 adjacent the pointer 54. Reference may also be made to FIG. 3A for clarity of explanation. The differing sections 58A through 58D of the indicia 58 alert a user when belt tension is correct, 58A, in an acceptable operating area, 58B, requires adjustment, 58C or is prohibitive and not advised for use, 58D FIG. 3 illustrates the indicia 58 best.

The use of the tension operating zone member 58, actuator 51, roller 44, linkage 49 and spring 44 have been found to be particularly useful to allow a user to apply the correct tension to the belt system 26. With consistent tension, the motor 20, auger 24 and belt system 26 have reduced wear, run at a cooler temperature and experience lower operating costs due to longer utility periods. It has been found, advantageously, that the over centre linkage formation created by linkage 49, actuator 51 as well as the spring tensioned roller 44 allow for a certain degree of "give" or mechanical force irregularity considering the multiple linkages and spring action. Conveniently, this has significant benefit to the operation of the entire apparatus; with consistent tension on the belt system 26, irregular or varying torque is reduced on the auger 12 and related drive components which further reduces long term operating costs. As noted above, users previously relied on guesswork to ascertain the correct belt tension, since no on-board solution was provided to ensure proper tensioning. Further, previously no solution was provided for compensation in the mechanical interplay between drive components.

Figure 5:
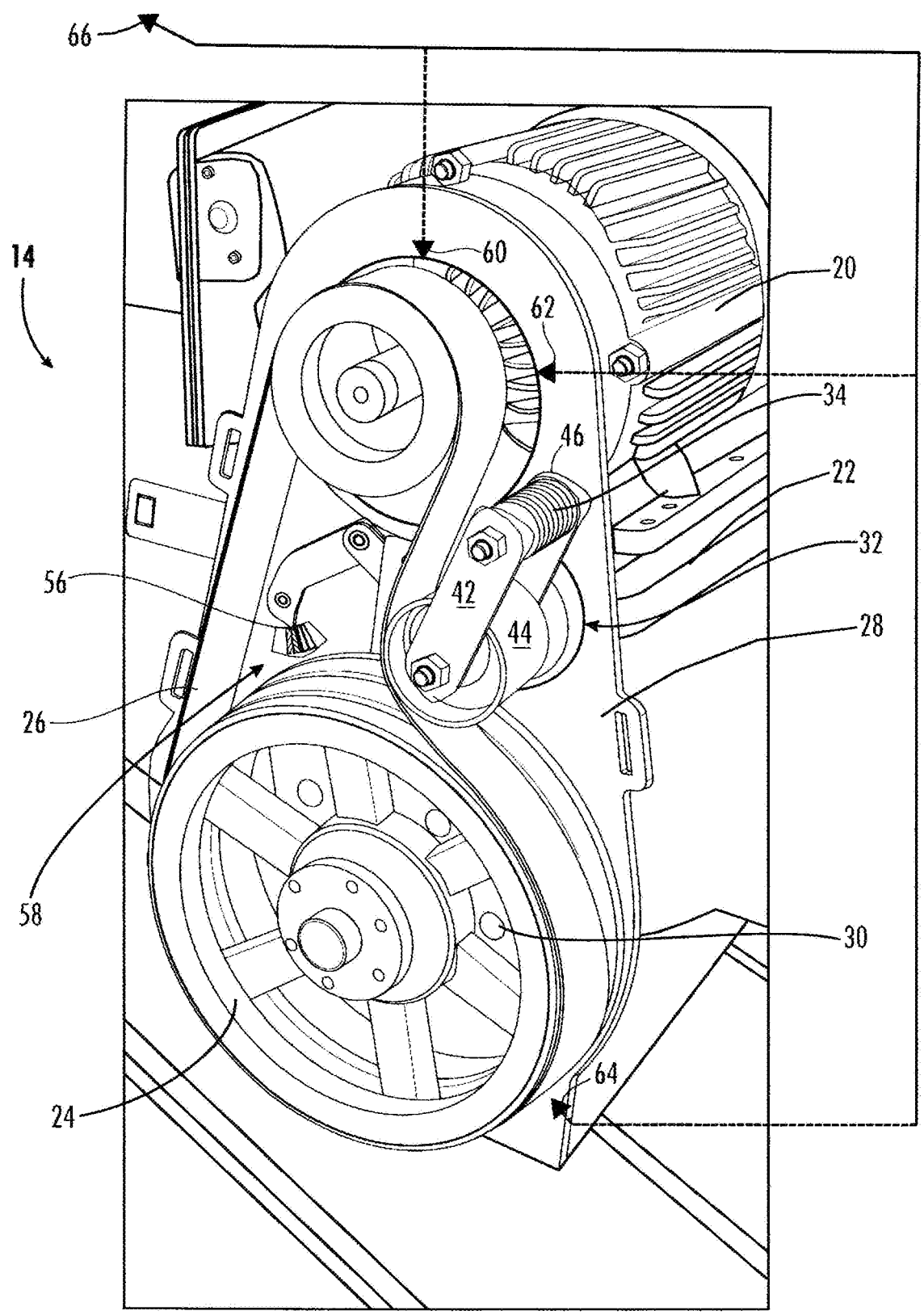
FIG. 5 is an illustration in accordance with another embodiment of the present invention.

In alternative embodiments, FIG. 5 may be referenced. The arrangement may include a motor speed sensor 60, belt temperature sensor 62 and pulley speed sensor 64. All of the sensors 60,62 and 64 may be linked and transmit data to a remote location as generally indicated by numeral 66, such a CPU, cellular phone etc. (not shown) for monitoring efficiency of operation.

Figure 6:
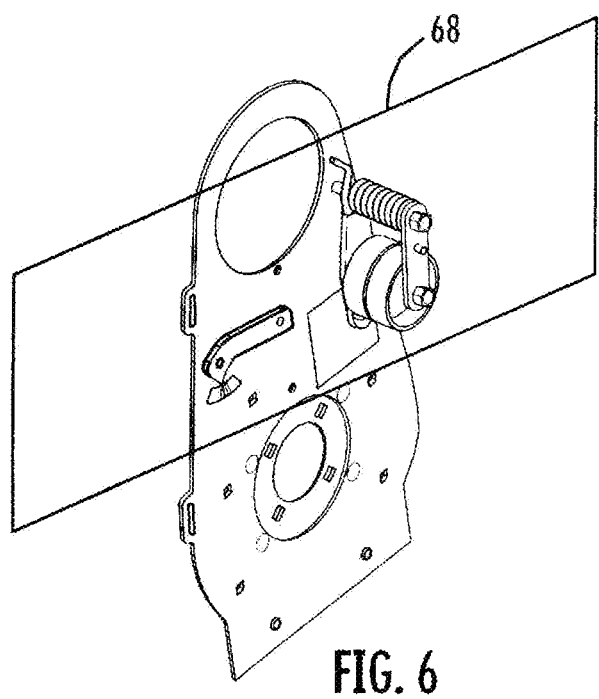
FIG. 6 is a sectional view of one embodiment of the present invention.
Figure 6A:
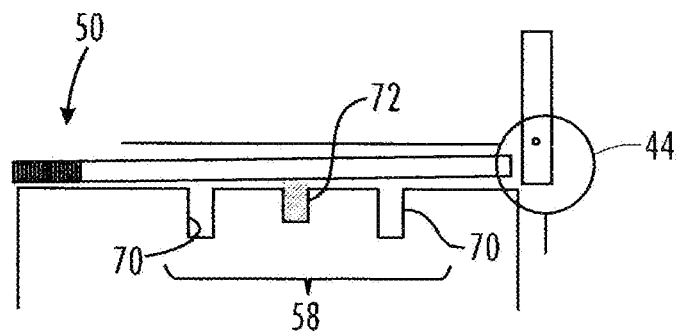
FIG. 6A is a sectional view of a further embodiment of the present invention.

Referring now to FIG. 6, a section of the arrangement is isolated in box 68. FIG. 6A shows an isolated area of box 68 with parts removed for clarity. In the embodiment of FIG. 6A, motion of the adjustment of the actuator 51 may be slidable horizontally to effect movement of the roller 44. In this manner, the pivoting movement associated with the previous embodiment, may be substituted by slidable adjustment. In this configuration, tension operating zone member 58 may comprise channels or recesses 70 into which a boss 72 or other mating configuration may be received upon disengagement therewith and sliding movement into an adjacent recess or channel as illustrated in FIG. 6A. Suitable connection to the roller allows for the adjustment of the roller 44.

Figure 6B:
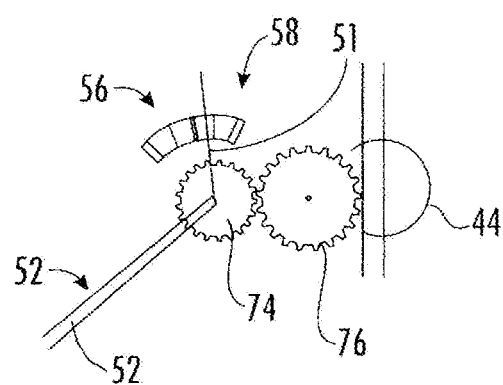
FIG. 6B is a sectional view of a further embodiment of the present invention.

Turning to FIG. 6B, shown is a further alternative embodiment of the arrangement where the adjustment of tension utilizing roller 44 is achieved through rotational movement. In this embodiment, actuator 51 may include a gear 74 meshing with a second gear 76 operatively driving roller 44 for tensioning movement of the belt 26 (not shown).

In all embodiments, the arrangements may include at least one of audible and visual aids associated with the tension operating zone member 58 to assist a user in the proper location of pulley 44.

Figure 7:
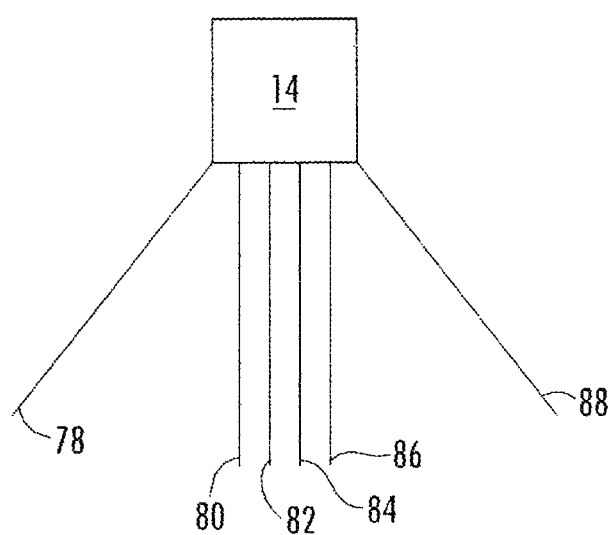
FIG. 7 is a schematic view of a further embodiment of the present invention.

FIG. 7 is a schematic illustration where the arrangement of the present invention may be utilized in conveyors 78, presses 80, sawmills 82, laundry devices 84, exhaust systems 86, pumps 88 inter inter alia.

We claim:

1. A belt tensioning apparatus for use in tensioning a belt driven drive system having a motor and belt driven member, comprising:
    a mounting member for mounting adjacent said motor and said belt driven member;
    a belt having an inside surface and an outside surface;
    a belt tensioning member in biased connection with said mounting member outside of said belt and moveable for applying adjustable tension to said outside surface of said belt when said inside surface of said belt is positioned about said motor and said belt driven member;
    an actuator linkage assembly having:
    a first linkage operatively connected to said belt tensioning member:
    an intermediate linkage;
    an actuator linkage;
    said intermediate linkage operatively connected between said first linkage and said actuator linkage for effecting movement of said belt tensioning member into or out of contact with said outside surface of said belt by corresponding movement of said intermediate linkage; and
    a tension operating zone member cooperative with movement of said actuator linkage to alert a user when belt tension is optimal, requires adjustment or is prohibitive.

2. The apparatus as set forth in claim 1, wherein said actuator linkage is pivotally connected to said belt tensioning member.

3. The apparatus as set forth in claim 1, wherein said actuator linkage is rotationally connected to said belt tensioning member.

4. The apparatus as set forth in claim 1, wherein said tension operating zone member comprises a pointer for cooperation with said tension operating zone member.

5. The apparatus as set forth in claim 4, wherein said tension operating zone member comprises a switch.

6. The apparatus as set forth in claim 5, wherein said tension operating zone member includes an electromechanical member operable with said switch.

7. The apparatus as set forth in claim 6, wherein said electromechanical member includes an audible signal associated with different tension of said belt.

8. The apparatus as set forth in claim 1, wherein said actuator linkage is remotely controllable by a user.

9. The apparatus as set forth in claim 7, wherein said apparatus includes a transmitter member for transmitting at least one of motor speed, belt temperature and driven member speed.

10. The apparatus as set forth in claim 1, in combination with at least one of a sweep auger, a grain auger, a portable conveyor auger and combinations thereof.

11. A belt tensioning apparatus for use in tensioning a belt on a belt driven drive system having a motor and belt driven member, comprising:
    a mounting member for mounting adjacent said motor and said belt driven member;
    a biased tensioning member operatively connected to said mounting member moveable thereon for selectively applying tension to an outside surface of said belt when an inside surface of said belt is positioned about said motor and said belt driven member;
    an actuator linkage assembly having:
    a first linkage operatively connected to said tensioning member;
    an intermediate linkage;
    an actuator linkage,
    said intermediate linkage operatively connected between said first linkage and said actuator linkage, said actuator linkage operable for effecting movement of said tensioning member by corresponding movement of said intermediate linkage;
    a tension operating zone member cooperative with movement of said actuator linkage to alert a user when belt tension is optimal, requires adjustment or is prohibitive; and
    a belt driven system connected therewith.

12. The apparatus as set forth in claim 11, wherein said intermediate linkage fixes said biased tensioning member into or out of contact with said belt.

13. The apparatus as set forth in claim 11, in combination with at least one of a sweep auger, a grain auger, a portable conveyor auger and combinations thereof.

14. A method for adjusting belt tension on a belt on a belt driven system having a motor and belt driven member, comprising:
    providing a mounting member for mounting adjacent said motor and said belt driven member;
    providing a belt tensioning member in biased connection on said mounting member;
    providing an actuator linkage assembly on said mounting member for linked connection to said belt tensioning member for applying adjustable tension to an outside surface of said belt when positioned about said motor and said belt driven member said assembly including a first tensioning member linkage, an actuator linkage and an intermediate linkage operatively connected to said first tensioning member linkage and said actuator linkage
    utilizing an actuator operatively connected to said actuator linkage to effect movement of said belt tensioning member; and
    providing at least one of visual and audible information to a user when belt tension is optimal, requires adjustment or is prohibitive.

15. The method as set forth in claim 14, further including the step of releasing belt tension entirely for belt removal.

16. The method as set forth in claim 15, further including the step of remotely operating said actuator.

17. The method as set forth in claim 14, further including the step utilizing said belt driven apparatus for a sweep auger, grain auger, portable auger and combinations thereof.

18. The method as set forth in claim 14, wherein tensioning said belt is conducted remotely.

19. The method as set forth in claim 18, wherein said actuator is operatively connected to said belt tensioning member in at least one of pivoting, rotation and sliding relation.

20. The method as set forth in claim 19, further including the step of monitoring motor speed, belt temperature and driven member speed.

* * * * *